(12) United States Patent
Legallais

(10) Patent No.: US 7,931,465 B2
(45) Date of Patent: Apr. 26, 2011

(54) OBJECT TRANSFERRING DEVICE WITH A TRANSFER ARM HAVING A SUBSTANTIALLY VERTICALLY MOVABLE GRIPPER HEAD

(75) Inventor: Stéphane Legallais, Octeville-sur-Mer (FR)

(73) Assignee: Sidel Participations (FR)

( * ) Notice: Subject to any disclaimer, the term of this patent is extended or adjusted under 35 U.S.C. 154(b) by 496 days.

(21) Appl. No.: 12/147,931

(22) Filed: Jun. 27, 2008

(65) Prior Publication Data
US 2009/0004322 A1 Jan. 1, 2009

(30) Foreign Application Priority Data
Jun. 28, 2007 (FR) .................................. 07 04658

(51) Int. Cl.
*B29C 49/70* (2006.01)
*B29C 31/08* (2006.01)
(52) U.S. Cl. .................. 425/534; 198/470.1; 198/474.1; 425/537
(58) Field of Classification Search .................. 425/537, 425/534; 198/470.1, 474.1; 65/241, 260
See application file for complete search history.

(56) References Cited

U.S. PATENT DOCUMENTS

| | | | | |
|---|---|---|---|---|
| 1,894,576 A * | 1/1933 | Tremblay | ......................... | 65/260 |
| 2,096,264 A * | 10/1937 | Schutz | .......................... | 414/564 |
| 2,609,943 A * | 9/1952 | Winder | ........................ | 198/470.1 |
| 3,175,702 A * | 3/1965 | Banyas | .......................... | 414/733 |
| 3,705,026 A * | 12/1972 | McReynolds et al. | .......... | 65/232 |
| 3,778,213 A | 12/1973 | Di Settembrini | | |
| 5,232,717 A * | 8/1993 | Voss | ............................... | 425/534 |
| 6,938,753 B2 * | 9/2005 | Bonatti et al. | ............. | 198/470.1 |
| 2007/0256911 A1 | 11/2007 | Legallais et al. | | |

FOREIGN PATENT DOCUMENTS

| | | |
|---|---|---|
| CN | 2878035 Y | 3/2007 |
| EP | 0 334 483 A2 | 9/1989 |
| FR | 2 098 471 A | 3/1972 |
| FR | 2 867 171 A1 | 9/2005 |

OTHER PUBLICATIONS

French Preliminary Search Report dated Jan. 17, 2008.

* cited by examiner

*Primary Examiner* — Robert B Davis
(74) *Attorney, Agent, or Firm* — Sughrue Mion, PLLC

(57) ABSTRACT

A device for transferring objects, in particular containers such as preforms or bottles, comprising a support (2) which is rotated about an substantially vertical rotational axis and which supports at least one transfer arm (3) with an inner radial part fixed to the support (2) and an outer radial part (6) adapted for sliding with respect to said inner radial part along an elongation axis held within a plane substantially perpendicular to the rotational axis of said support (2), the outer radial part (6) having a gripper head (13) adapted for supporting at least one object, wherein said head (13) is adapted for sliding, with respect to the inner radial part, along an elongation axis substantially parallel to the rotational axis of the support (2).

5 Claims, 1 Drawing Sheet

OBJECT TRANSFERRING DEVICE WITH A TRANSFER ARM HAVING A SUBSTANTIALLY VERTICALLY MOVABLE GRIPPER HEAD

FIELD OF THE INVENTION

The present invention relates to a device for transferring objects, in particular containers such as preforms or bottles, of the type comprising a rotating support which is rotated continuously about an substantially vertical rotational axis and which supports at least one transfer arm provided with a gripper head able to support at least one object.

BACKGROUND OF THE INVENTION

Transfer devices of this type are used in machines for blow-molding containers, in which the container is obtained by blow-molding, in a blow mold, a hot preform previously manufactured by injection molding. Such blow-molding machines are used in particular for manufacturing polyethylene terephthalate (PET) bottles.

The perform, which is commonly in the form of a tube, one end of which is closed and the other end of which already has the final form of the neck of the container, is conveyed into the mold after having been heated to an appropriate temperature in a thermal processing oven. Once it has been blow-molded, each container is removed from the mold in order to be sent to the output from the machine.

In general, in the context of producing containers at a high production rate, the blow-molding machines are of the rotary type with a carousel that turns continuously about an axis and which bears on its periphery a series of identical molds.

Conveying devices or transfer devices with a transfer arm thus allow preforms to be introduced into the molds, on the one hand, and the finished containers to be withdrawn, on the other, without having to stop the carousel.

Such transfer devices are described and shown for example in documents FR 2,867,171 and FR 2,802,191, both of which are in the name of the Applicant.

On another hand, in a manner often implemented in plants produced by the Applicant, the molding devices for blow-molding or stretch-blow-molding thermoplastic containers, such as preforms, comprise at least one three-part mold (for example of the type named "jackknife opening"), namely two half molds for the body of the container and a mold bottom for the base of the container, the two half molds being arranged such that they can be displaced with respect to each other between an open position and a closed position, the lower parts of the two half molds and the upper part of the mold bottom having mutually interlocking means in the closed position of the mold in order to lock them together.

Providing a mold with only two half molds is possible when the container to be manufactured has a base with a relatively simple shape and can easily be extracted from the mold by a transfer device as mentioned hereinabove. This is the case in particular when the base of the container has no pronounced reliefs (for example a hemispherical base or flat base).

However, when the base has a complex form (for example a petaloid base or dome-shaped base with an inwardly directed convexity), the mold bottom part encloses and traps the base of the formed container and the latter cannot be extracted from the mold, without touching this mold bottom part, if using transfer devices as are currently employed. In other words, the container cannot be extracted from a two-part mold without being deformed and therefore damaged.

In order to remedy this problem, and as is described in document FR 2,841,495 in the name of the Applicant, three-part molds with an axially displaceable mold bottom are used to manufacture containers having a base with a complex shape.

However, in order to produce an axially displaceable mold bottom, it is necessary to provide displacement means for displacing this mold bottom synchronously with the opening and closing movements of the two half molds, this being relatively complex to implement and cumbersome.

SUMMARY OF THE INVENTION

It would therefore be particularly advantageous to produce a device for transferring objects of the blow-molded container type, which device allows the blow-molded containers to be extracted from the mold without risking damage and spoiling, whatever shape the mold bottom has, without an axially displaceable mold bottom needing to be employed.

The present invention aims to solve the abovementioned problems by means of a device for transferring objects, in particular containers such as preforms or bottles, comprising a rotating support which is rotated continuously about an substantially vertical rotational axis and which supports at least one transfer arm, of the type in which the transfer arm is telescopic with an inner radial part fixed to the support and an outer radial part able to slide with respect to the inner radial part along an elongation axis held within a plane substantially perpendicular to the rotational axis of said support, the outer radial part having a gripper head adapted for supporting at least one object, said transfer device being characterized in that the gripper head is adapted for sliding, with respect to the inner radial part, along an elongation axis substantially parallel to the rotational axis of the support, whereby a blow-molded container can be extracted from a blow mold by lifting the container vertically.

According to one advantageous embodiment, the outer radial part of the transfer arm has sliding connection means on which the gripper head is fixed.

Advantageously, the sliding connection means are in the form of a slideway.

Likewise advantageously, the gripper head is linked to a roller adapted for following a cam way in order to control the substantially vertical movement of the gripper head.

Also advantageously, a cam controlling the substantially vertical displacement of the gripper head is located at the periphery of the rotating support.

BRIEF DESCRIPTION OF THE DRAWING

The present invention will now be described with the aid of a purely illustrative preferred exemplary embodiment of the invention which does not limit the scope of the present invention in any way, referring to the appended drawing in which.

DETAILED DESCRIPTION OF THE INVENTION

Figure 1:
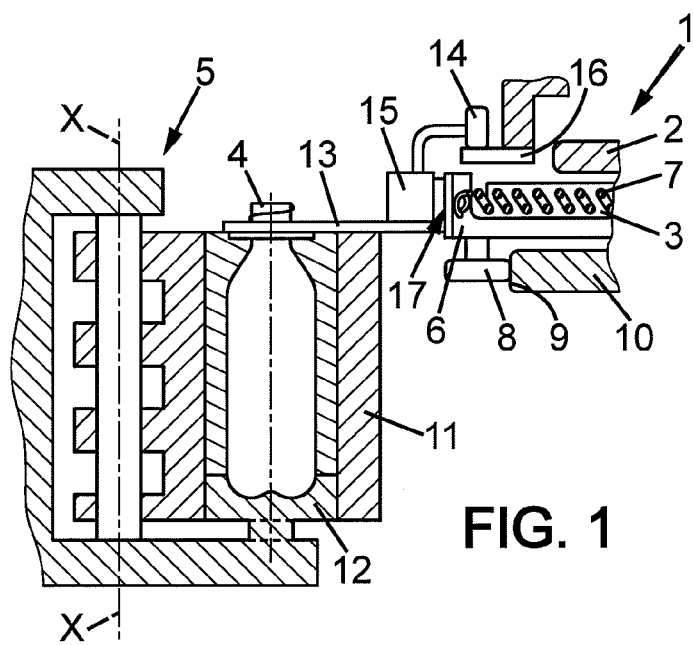
FIG. 1 shows a partial view in schematic cross section of the transfer device according to the invention with the gripper head of a transfer arm having grasped the blow-molded container, the mold being in a closed position thereof.
Figure 2:
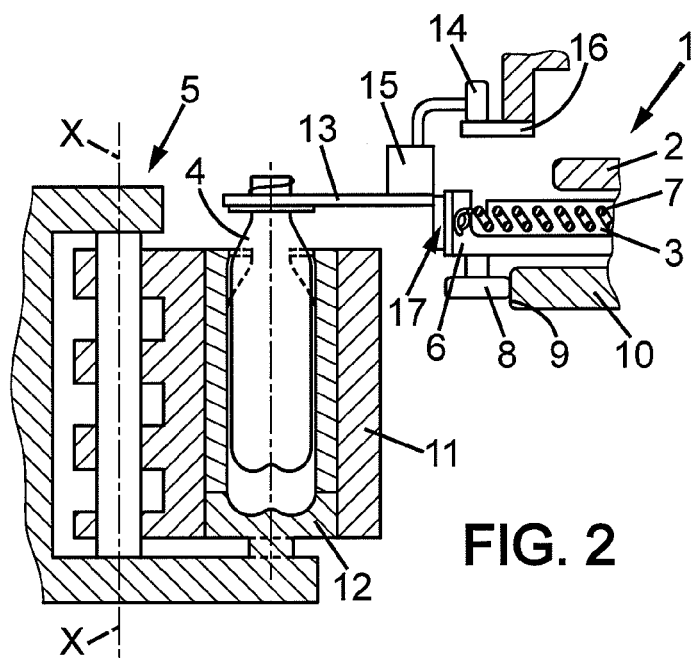
FIG. 2 shows a partial view in schematic cross section of the transfer device according to the invention with the gripper head of a transfer arm having extracted the blow-molded container, the mold now being in an open position thereof.

As shown schematically in the partial views in schematic cross section of FIGS. 1 and 2, a device 1 for transferring objects, in particular containers such as preforms or bottles, according to the invention is in the form of a rotating support 2 (generally in the form of circular plate) rotated continuously about an substantially vertical rotational axis and on which at least one transfer arm 3 is fixed. A substantially "vertical" direction is understood to mean a direction substantially perpendicular to the plane of the ground.

In order to allow containers 4 blow-molded in the mold 5 to be grasped, the transfer arm 3 is designed to have an inner radial part (not shown in the figures, but of any type known per se) fixed to the support 2 and an outer radial part 6 adapted for sliding with respect to the inner radial part along an elongation axis held within a plane substantially perpendicular to the rotational axis of the support 2.

An outer radial part 6 having spring means 7 fixed to the inner radial part and adapted for stretching in an substantially radial direction is thus schematically shown in FIGS. 1 and 2. It is known that the radial extension of the transfer arm can be controlled by means of a cam follower of the roller 8 type, fixed to the outer radial part of the transfer arm 3, adapted for following a cam way 9 formed, for example, by the periphery of a fixed base 10 provided opposite one of the support surfaces 2 and in an substantially transverse plane to the rotational axis of the support 2. Thus the elongation of the transfer arm 3 is controlled by a cam system in relation with the angular position of the arm about the rotational axis of the support 2.

The transfer device 1 according to the invention is more particularly, although not exclusively, designed to extract molded containers 4 from a mold 5 comprising two half molds 11 and a mold bottom 12, the mold bottom 12 being integrated into the half molds 11 or able to be interlocked in the two half molds 11. In this example, the two half molds 11 are both able to move about a substantially vertical rotational axis X-X allowing the two half molds to pivot about this axis X-X (a type of mold commonly named "jackknife opening").

Preferably, the mold bottom 12 is only able to move transversely and not vertically.

The outer radial part 6 has a gripper head 13 generally in the form of a clamp having two jaws adapted for grasping the neck of the container 4.

While the container 4 is being grasped by the gripper head 13, and as is illustrated schematically in FIG. 1, the gripper head 13 is in the low position, whereas while the container 4 is being extracted from the mold 5 following molding, the gripper head 13 is in the high position, as is illustrated schematically in FIG. 2.

In order to control the passage of the gripper head 13 from its low position to its high position, a cam follower member of the type of a roller 14 is provided, which is fixed to the gripper head 13 by fixing means 15 of any type known per se.

The cam follower member 14 is arranged for engagement with a cam 16 to control the substantially vertical movement of the gripper head 13, the cam 16 being preferably located at the periphery of the rotating support 2.

In addition, the outer radial part 6 of the transfer arm 3 comprises sliding connection means 17 on which the gripper head 13 is fixed.

The sliding connection means 17 are, according to a preferred embodiment, in the form of a slideway 18. As shown, for example, in the cross-sectional view of FIG. 3, this may be a ball bearing slideway of a type known per se, comprising a first fixed support profile 19 and a second profile 20 adapted for sliding with respect to the first profile 19 by means of balls 21 inserted between the two profiles, the gripper head 13 being fixed on the second profile 20.

Figure 3:
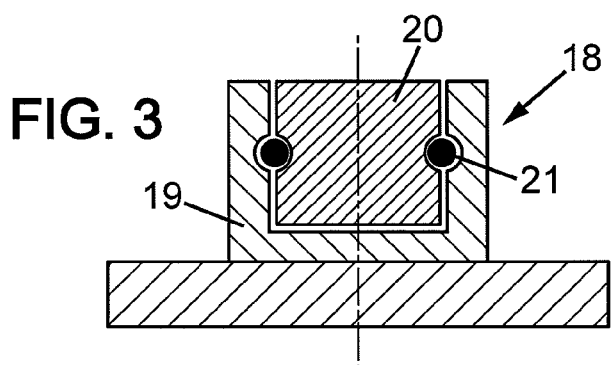
FIG. 3 shows a schematic cross-sectional view of a slideway connecting the body of the transfer arm and the gripper head.

It is nevertheless possible to provide any other possible form of slideway, not just the slideway embodiment illustrated in FIG. 3.

Thus, by virtue of the gripper head 13 according to the invention, it is possible to extract molded containers upward without needing to provide a mold bottom that can be removed vertically downward, as is commonly the case in the prior art.

What is claimed is:

1. A device for transferring objects, in particular containers such as preforms or bottles, comprising a rotating support which is rotated continuously about a substantially vertical rotational axis and which supports at least one transfer arm, of the type in which said transfer arm is telescopic with an inner radial part fixed to said support and an outer radial part adapted for sliding with respect to said inner radial part along an elongation axis held within a plane substantially perpendicular to said rotational axis of said support, said outer radial part having a gripper head adapted for supporting at least one object, wherein said gripper head is adapted for sliding, with respect to said inner radial part, along an elongation axis substantially parallel to said rotational axis of said support so as to have a substantially vertical movement, whereby a blow-molded container can be extracted from a blow mold by lifting said container vertically.

2. The device as claimed in claim 1, wherein said outer radial part of said transfer arm has sliding connection means on which said gripper head is fixed.

3. The device as claimed in claim 2, wherein said sliding connection means are in the form of a slideway.

4. The device as claimed in claim 1, wherein said gripper head is linked to a roller adapted for following a cam way in order to control said substantially vertical movement of said gripper head.

5. The device as claimed in claim 1, wherein a cam controlling said substantially vertical displacement of said gripper head is located at the periphery of said rotating support.

* * * * *